United States Patent
Kuo et al.

(10) Patent No.: US 9,134,052 B2
(45) Date of Patent: Sep. 15, 2015

(54) MAGNETIC HEAT EXCHANGE UNIT

(75) Inventors: Chung-Jung Kuo, Taoyuan Hsien (TW); Tiao-Yuan Wu, Taoyuan Hsien (TW); Sheng-Fan Hsieh, Taoyuan Hsien (TW); Chieh-shih Chang, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 215 days.

(21) Appl. No.: 13/607,177

(22) Filed: Sep. 7, 2012

(65) Prior Publication Data

US 2013/0061602 A1 Mar. 14, 2013

Related U.S. Application Data

(60) Provisional application No. 61/532,696, filed on Sep. 9, 2011.

(51) Int. Cl.
*F25B 21/00* (2006.01)

(52) U.S. Cl.
CPC . *F25B 21/00* (2013.01); *Y02B 30/66* (2013.01)

(58) Field of Classification Search
CPC ......... F25B 21/00; F25B 9/006; Y02B 30/66; H01F 1/012; F28D 20/00; F03G 7/08
USPC .................. 62/3.1, 114; 165/104.11; 290/1 R
See application file for complete search history.

(56) References Cited

U.S. PATENT DOCUMENTS

| | | | |
|---|---|---|---|
| 3,125,861 A * | 3/1964 | Jaep | 62/3.7 |
| 7,481,064 B2 * | 1/2009 | Kitanovski et al. | 62/3.1 |
| 2005/0000230 A1 * | 1/2005 | Saito et al. | 62/3.1 |
| 2009/0091411 A1 * | 4/2009 | Zhang et al. | 335/306 |
| 2009/0308079 A1 * | 12/2009 | Lee | 62/3.1 |

FOREIGN PATENT DOCUMENTS

| | | |
|---|---|---|
| JP | 2009524796 | 7/2009 |
| WO | WO2007086638 | 8/2007 |
| WO | WO2009024412 | 2/2009 |

* cited by examiner

*Primary Examiner* — Melvin Jones
(74) *Attorney, Agent, or Firm* — Muncy, Geissler, Olds & Lowe, P.C.

(57) ABSTRACT

A magnetic heat exchange unit includes a magnetocaloric material, and at least one fluid pathway. The fluid pathway is formed in the magnetocaloric material and has a fluid inlet and a fluid outlet. A main fluid flowing direction is defined between the fluid inlet and the fluid outlet, and the cross-section of the fluid pathway varies along the main fluid flowing direction.

13 Claims, 12 Drawing Sheets

MAGNETIC HEAT EXCHANGE UNIT

CROSS REFERENCE TO RELATED APPLICATIONS

This Application claims the benefit of priority from U.S. Provisional Application Ser. No. 61/532,696, filed Sep. 9, 2011, teachings of which are herein incorporated by reference in their entirety.

BACKGROUND OF THE INVENTION

1. Field of the Invention

The invention relates to a magnetic heat exchange unit, and more particularly, the invention concerns a novel fluid pathway structure which is applied in a magnetic heat exchange unit.

2. Description of the Related Art

Magnetic refrigeration is considered as a highly efficient and environment-friendly cooling technology. Magnetic refrigeration technologies adapt magnetocaloric effect of magnetocaloric materials (MCM) to realize or utilize refrigeration cycles.

Specifically, magnetocaloric refrigeration is realized by the following steps: (1) a magnetic field is applied to magnetocaloric materials, and an increasing external magnetic flux causes the magnetocaloric materials to heat up; (2) while the magnetic field is held constantly, a coolant is provided to take away heat generated from the magnetocaloric materials; (3) once the magnetocaloric materials are sufficiently cooled down, the magnetic field is removed or decreased largely, and the coolant is stopped from being supplied thereto; and (4) due to its nature of having magnetocaloric effect, the magnetocaloric materials turn to cool down to a lower temperature. Then, a working fluid is provided to bring coldness from the magnetocaloric materials.

Japan patent publication No. 2009524796 discloses a magnetic heat exchange unit. The heat exchange unit has a case and a plurality of magnetocaloric materials disposed in the case. The magnetocaloric materials are connected in a baffle manner, and thus a plurality of fluid pathways are formed therebetween. While operating the magnetic heat exchange unit, a heat transfer medium flows through the fluid pathways to exchange heat generated from the magnetocaloric materials.

World patent publication No. 2009024412 utilizes a round shaped magnetocaloric bed as a magnetic heat exchange unit, wherein a plurality of fin shaped plates are disposed on the magnetocaloric bed, and fluid pathways are defined between each two neighboring fin shaped plates, respectively. A heat transfer medium is forced to flow through the fluid pathways so as to exchange with heat generated from the magnetocaloric bed.

In the described patents, however, temperature differences between the heat transfer media and the magnetocaloric materials are gradually decreased along the fluid pathways resulting in a decrease in heat exchange efficiency. Additionally, magnetocaloric materials are wasted because the magnetocaloric materials disposed in the fluid outlet can not perform a better refrigeration cycle. Such wasting profoundly increases cost and hinders economic considerations.

BRIEF SUMMARY OF THE INVENTION

In an effort to eliminate the disadvantages of the magnetic heat exchange units described above, the present invention discovered that a significant factor affecting refrigeration efficiency of the magnetic refrigeration resides in the heat exchange efficiency between the magnetocaloric materials and a heat transfer media. In this regard, a novel design of a fluid pathway is proposed, wherein heat exchange performance is effectively maintained and the heat exchange efficiency is improved.

In order to achieve the above-described objective, one object of the invention is to provide a magnetic heat exchange unit that comprises a magnetocaloric material, and at least one fluid pathway. The fluid pathway is formed in the magnetocaloric material and has a fluid inlet and a fluid outlet. A main fluid flowing direction is defined between the fluid inlet and the fluid outlet, and the cross-section of the fluid pathway varies along the main fluid flowing direction.

Another object of the invention is to provide a magnetic heat exchange unit that comprises a case, at least one heat-exchanging element, and at least one fluid pathway. The heat-exchanging element comprises magnetocaloric materials and is disposed in the case. The fluid pathway is defined by the case and the heat-exchanging element and has a fluid inlet and a fluid outlet. A main fluid flowing direction is defined between the fluid inlet and the fluid outlet, and the cross-section of the fluid pathway varies along the main fluid flowing direction.

The novel form of the fluid pathway of the present invention is uniquely capable of modifying a cross-section of the fluid pathway in accordance with different heat exchange capacity or efficiency of heat transfer media and magnetocaloric materials that construct the fluid pathway, wherein optimal selection or modification of magnetocaloric materials considering heat exchange capacity or efficiency and a magnetic heat exchanger thereof is achieved. Additionally, a reduction in usage of the magnetocaloric materials is realized, and the cost is lowered.

BRIEF DESCRIPTION OF THE DRAWINGS

The invention can be more fully understood by reading the subsequent detailed description and examples with references made to the accompanying drawings, wherein:

FIGS. 10-17 show sectional views of varieties of forms of heat-exchanging elements of the magnetic heat exchange unit of the present invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is assumed that the term "cross-section" as used in the specification means an area which is sliced through a transversal line of a fluid pathway which is substantially perpendicular to a main fluid flow direction. It is assumed that the term "main fluid flowing direction" as used in the specification means a direction in which the heat transfer medium mainly flow through the fluid pathway.

Figure 1:
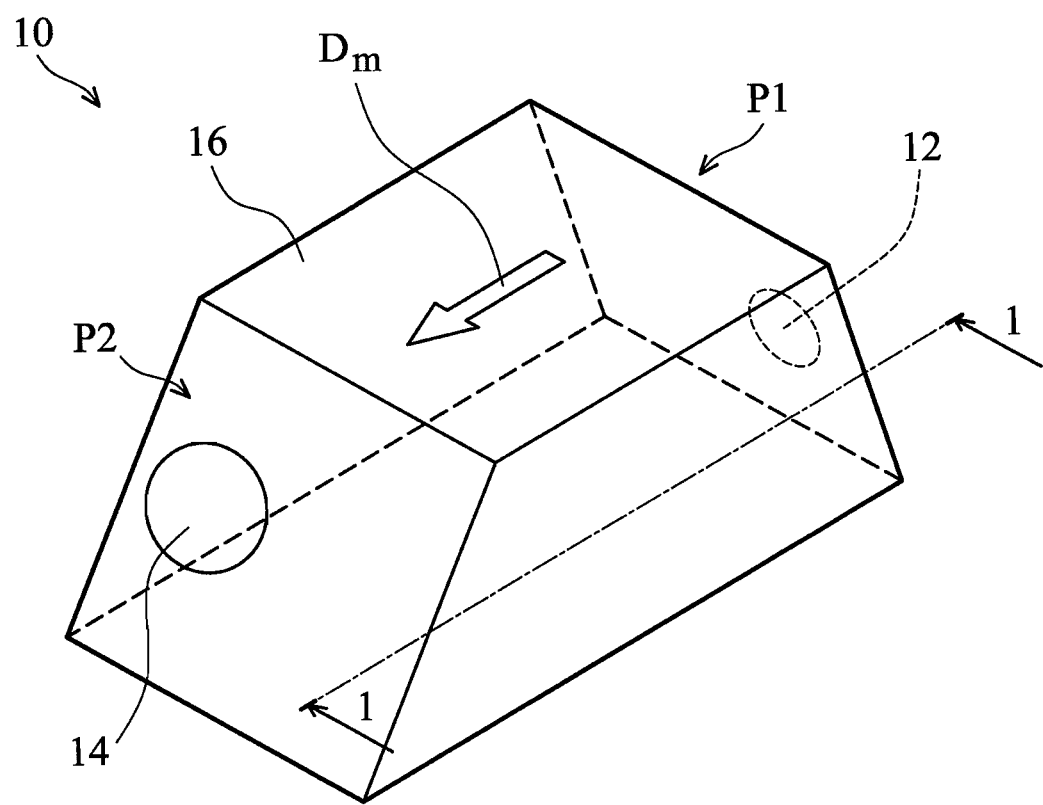
FIG. 1 shows a schematic view of a magnetic heat exchange unit of a preferred embodiment of the present invention.
Figure 2:
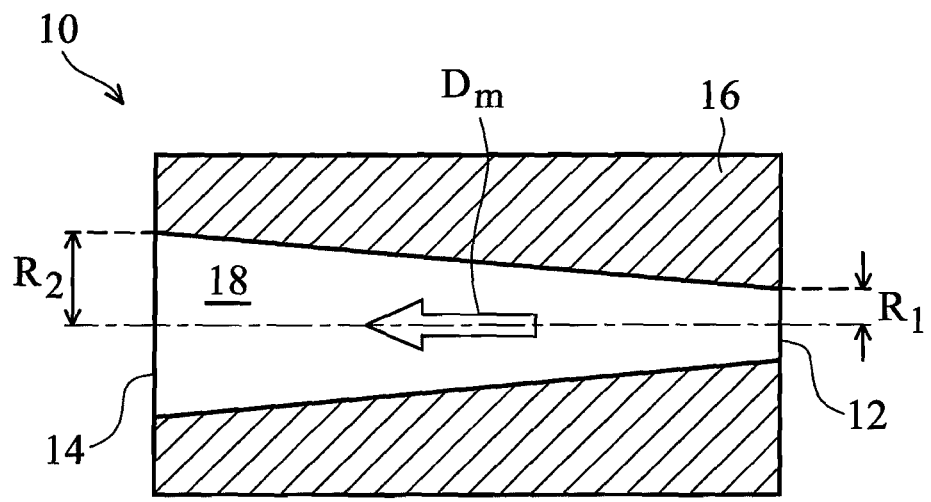
FIG. 2 is a sectional view taken along a line 1-1 of FIG. 1.

Referring to FIGS. 1 and 2, one embodiment of the magnetic heat exchange unit 10 is illustrated. The magnetic heat exchange unit 10 comprises two openings 12 and 14, a magnetocaloric material 16, and a fluid pathway 18. The fluid pathway 18 is formed in the magnetocaloric material 16. The two openings 12 and 14 are connected to two ends of the fluid pathway 18 and are formed on side walls of the magnetocaloric material 16 to receive or provide a heat transfer medium (not shown in FIGS. 1 and 2) from peripheral equipments (not shown in FIGS. 1 and 2).

According to the embodiment of the present invention the heat transfer medium flows through the magnetocaloric material 16 from the opening 12 (fluid inlet) to the opening 14 (fluid outlet). In other words, the heat transfer medium flows through the magnetic heat exchange unit 10 along the fluid pathway 18 in a main fluid flowing direction $D_m$. To detail, the two openings in the embodiment are seem as a fluid inlet (opening 12) and a fluid outlet (opening 14) for the heat transfer medium to flow through, respectively, and the main fluid flowing direction $D_m$ of the fluid pathway 18 is defined by the two openings 12 and 14. It is noted that, the main fluid flowing direction $D_m$ of the heat transfer medium should not be limited, and a person skilled in the art will understand that the heat transfer medium will substantially flow through the magnetic heat exchange unit 10 along the main fluid flowing direction $D_m$ and a direction neighboring or opposing the main fluid flowing direction $D_m$ reciprocally. In addiction, the flowing direction $D_m$, defined by the two openings 12 and 14, is not limited to be parallel with the symmetrical axis of the magnetocaloric material 16. As shown in FIG. 1, the two openings 12 and 14 are arranged eccentrically to the symmetrical axis of the magnetocaloric material 16 and are formed at opposite sides respective to the symmetrical axis, and thus the flowing direction $D_m$ is skew to the symmetrical axis. Furthermore, two planes P1 and P2 which two openings 12 and 14 lie could also be inclined with same or different angles. In this embodiment, two planes P1 and P2 are inclined by different angles referring to a bottom plane of the magnetocaloric material 16.

The magnetocaloric material of the embodiment and other embodiments to be discussed of the specification or present disclosure is, for example but not to be limited, FeRh, $Gd_5Si_2Ge_2$, $Gd_5(Si_{1-x}Ge_x)_4$, $RCo_2$, $La(Fe_{13-x}Si_x)$, $MnAs_{1-x}Sb_x$, MnFe(P, As), MnFe(P, Si), $Co(S_{1-x}Se_x)_2$, NiMnSn, MnCoGeB, $R_{1-x}M_xMnO_3$, (where R=lanthanide, M=Ca, Sr and Ba), . . . etc. The magnetocaloric material 16 can be made by mixing the aforementioned magnetocaloric material based elements together, depending on the end-use application and economic considerations.

The fluid pathway 18 is taper-shaped and is formed in the magnetocaloric material 16 in the embodiment. More specifically, the fluid pathway 18 has an initial radius $R_1$ at the opening (fluid inlet) 12 and a lager final radius $R_2$ at the opening (fluid outlet) 14, and is configured along an axis of the magnetic heat exchange unit 10. In the embodiment, the axis is substantially parallel to the main fluid flowing direction $D_m$. Thus, the cross-section of the fluid pathway 18 increases gradually along the main fluid flowing direction $D_m$. Additionally, due to the configuration of the fluid pathway 18, an amount of material usage in a region of the magnetocaloric material 16 near the opening (fluid outlet) 14 is less than that in a region of the magnetocaloric material 16 near the opening (fluid inlet) 12.

Advantages of the magnetic heat exchange unit 10 are described as follows. After the magnetocaloric material 16 heats up due to an external magnetic field, i.e., magnetic flux, the heat transfer medium is supplied all along the main fluid flowing direction $D_m$ to exchange heat energy generated from the magnetocaloric material 16. However, with a decrease of the temperature difference between the heat transfer medium and the magnetocaloric materials 16 while the heat transfer medium flows through the main fluid flowing direction $D_m$, heat exchange efficiency decreases. Thus, the fluid pathway 18 is designed with a larger radius $R_2$, which means a larger cross-section, at a region near the opening (fluid outlet) 14, so that heat exchange efficiency can be maintained. Additionally, the design where less amount of material is used in the region of the magnetocaloric material 16 near the opening (fluid outlet) 14 than that is used in the region of the magnetocaloric material 16 near the opening (fluid inlet) 12, where a smaller temperature difference between the two openings 12 and 14 is exhibited, i.e., a temperature cascade between the two openings 12 and 14 is exhibited, successfully reduces production cost as well.

Figure 3:
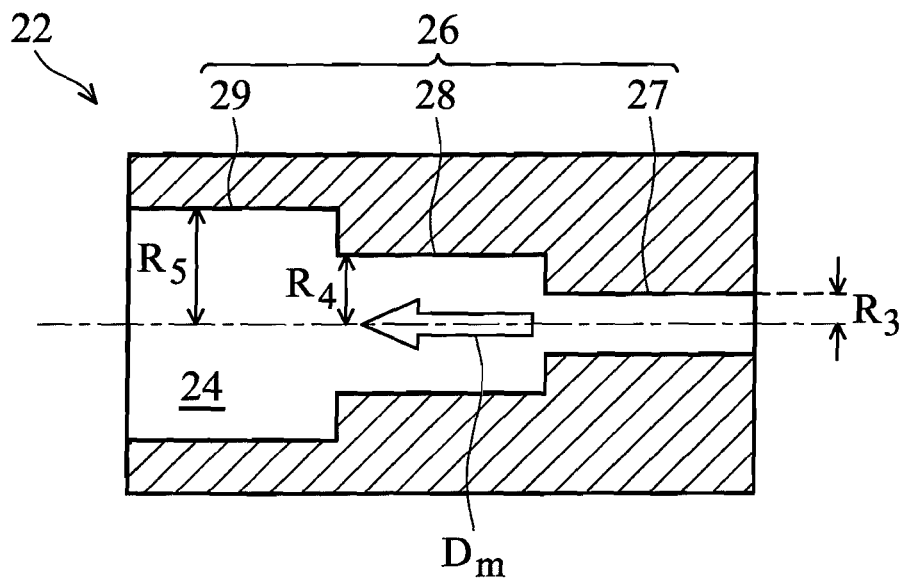
FIG. 3 shows a sectional view of another form of the magnetic heat exchange unit of the present invention.

Turning to FIG. 3, an alternative form of a magnetic heat exchange unit of the present invention is illustrated and generally designated by the numeral 22. The magnetic heat exchange unit 22 is similar in many respects to the previous described embodiment as shown in FIGS. 1 and 2, and comprises a magnetocaloric material 26 and a fluid pathway 24. The magnetocaloric material 26 comprises a first segment 27, a second segment 28 and a third segment 29, wherein the second segment 28 is interconnected between the first segment 27 and the third segment 29. The fluid pathway 24 is formed in the magnetocaloric material 26 and is defined by the first segment 27, the second segment 28 and the third segment 29. Wherein the first segment 27, the second segment 28 and the third segment 29 are varied in cross-sections by steps. The fluid pathway 24 is configured along an axis of the magnetic heat exchange unit 22. A main fluid flowing direction $D_m$ is substantially parallel to the axis of the magnetic heat exchange unit 22, and a heat transfer medium (not shown in FIG. 3) flows through the fluid pathway 24 along the main fluid flowing direction $D_m$.

The fluid pathway 24 in the regions of the first segment 27, the second segment 28, and the third segment 29, respectively have a radius $R_3$, $R_4$, and $R_5$. The radius $R_5$ is larger than the radius $R_4$, and the radius $R_4$ is larger than the radius $R_3$. In other words, the cross-section of the fluid pathway 24 in the third segment 29 is larger than that in the second segment 28, and the cross-section of the fluid pathway 24 in the second segment 28 is larger than that in the first segment 27. It's appreciated that due to the configuration of the fluid pathway 24, the magnetic heat exchange unit 22 advantageously provides similar results as the magnetic heat exchange unit 10 as shown in FIGS. 1 and 2.

Figure 4:
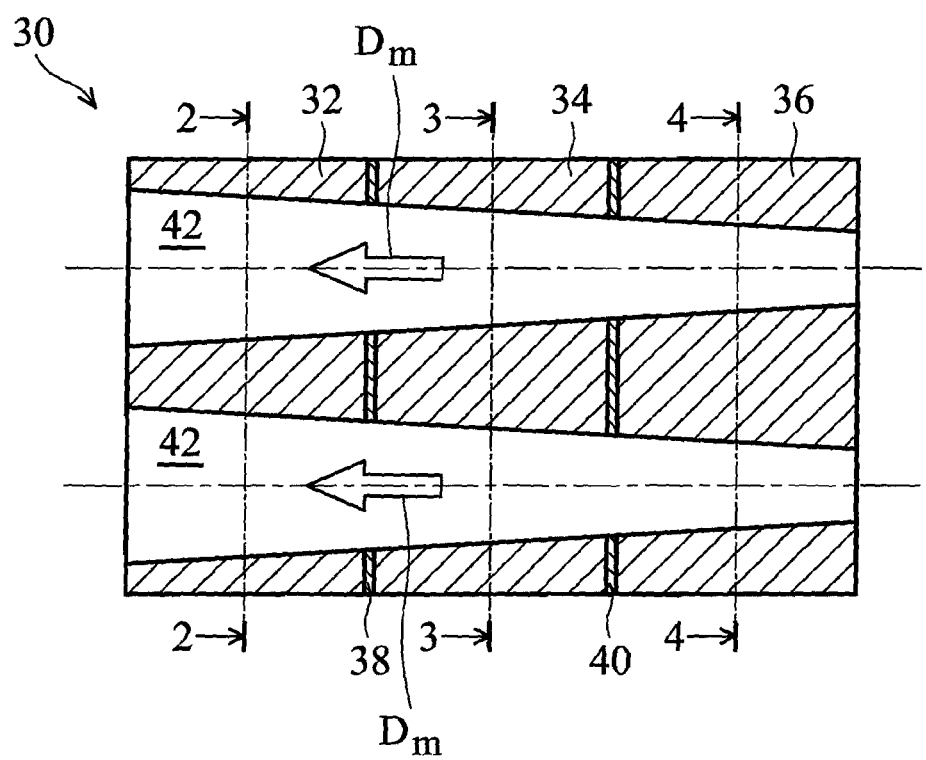
FIG. 4 shows a sectional view of still another form of the magnetic heat exchange unit of the present invention.
Figure 5C:
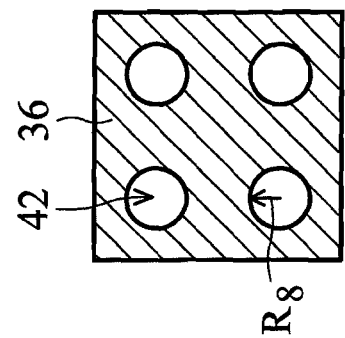
FIG. 5C is a sectional view taken along a line 4-4 of FIG. 4.
Figure 5B:
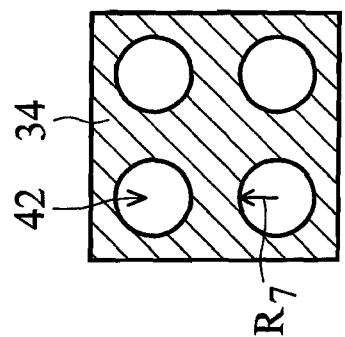
FIG. 5B is a sectional view taken along a line 3-3 of FIG. 4.
Figure 5A:
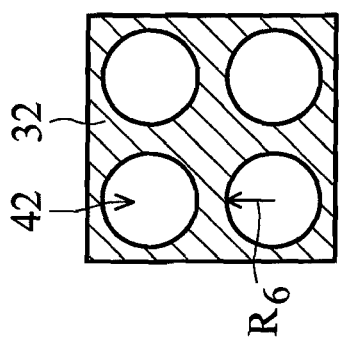
FIG. 5A is a sectional view taken along a line 2-2 of FIG. 4.

Turning to FIGS. 4 and 5A-5C, still an alternative form of a magnetic heat exchange unit of the present invention is illustrated and generally designated by the numeral 30, wherein FIGS. 5A-5C respectively shows sectional views taken along lines 2-2, 3-3, and 4-4 of FIG. 4, respectively. The magnetic heat exchange unit 30 is similar in many respects to the previous described embodiments as shown in FIGS. 1-3, and comprises three magnetocaloric materials 32, 34, and 36 in series, two insulators 38 and 40, and a plurality of fluid pathways 42. In the embodiment, the magnetic heat exchange unit 30 has four fluid pathways 42 as shown in FIGS. 5A-5C.

Each of the magnetocaloric materials 32, 34, and 36 has different Curie temperatures, a material property of a magnetocaloric material, and the magnetocaloric material 34 is interconnected between the magnetocaloric materials 32 and 36. The insulator 38 is disposed between the magnetocaloric materials 32 and 34, and the insulator 40 is disposed between the magnetocaloric materials 34 and 36. The insulators 38 and 40 are partially exposed in the fluid pathways 42 and configured to insulate heat conveyed between the magnetocaloric materials 32, 34, and 36. It is noted that the insulators 38 and 40 may be also electrical insulators.

The fluid pathways 42 in the embodiment are both laterally and transversely spaced-apart from one another and are disposed in the magnetic heat exchange unit 30. More particularly, the fluid pathways 42 are disposed in spaces constructed by the magnetocaloric materials 32, 34, and 36 and the insulators 38 and 40. Each of the fluid pathways 42 is taper-shaped, and along a main fluid flowing direction $D_m$ the cross-sections of the fluid pathways 42 successively become larger. Heat transfer media (not shown in FIG. 4) flow through the fluid pathways 42 along the main fluid flowing direction $D_m$ as other embodiments disclosed. For example, as shown in FIGS. 5A-5C, along the sliced line 2-2, the radius of each of the fluid pathways 42 in the magnetocaloric material 32 is $R_6$; along the sliced line 3-3, the radius of each of the fluid pathways 42 in the magnetocaloric material 34 is $R_7$; along the sliced line 4-4, the radius of each of the fluid pathways 42 in the magnetocaloric material 36 is $R_8$, wherein the radiuses $R_6$, $R_7$, and $R_8$ show mean radiuses of each segment and the radius $R_6$ is larger than the radius $R_7$, and the radius $R_7$ is larger than the radius $R_8$.

Thanks to the aforementioned arrangement, heat exchange efficiency is maintained in the fluid pathways 42, for example, but the invention is not limited by this particular example. The magnetocaloric material 32 is designed with a lowest Curie temperature among the three magnetocaloric materials 32, 34, and 36, so it has the highest temperature rising magnitude after the magnetic field is applied for a particular period of time. It will also be understood by a person skilled in the art that the magnetocaloric material 34 has a medium rising magnitude after the magnetic field is applied for a particular period of time, and the magnetocaloric material 36 has a lowest rising magnitude after the magnetic field is applied for a particular period of time when compared with all the three magnetocaloric materials 32, 34, and 36. Consequently, heat exchange efficiency is maintained because temperature difference or the temperature cascade of the magnetocaloric materials as aforementioned is existed.

It is also appreciated the insulators 38 and 40 disposed between the magnetocaloric materials 32, 34, and 36, the heat generated by the magnetocaloric materials 32, 34, and 36 is substantially flowing across the fluid pathways 42 which encourages conduction efficiency. It should be noted that although the magnetocaloric materials 32, 34, and 36 have different Curie temperatures, the magnetocaloric materials 32, 34, and 36 can be made by the same material or different materials.

Figure 6:
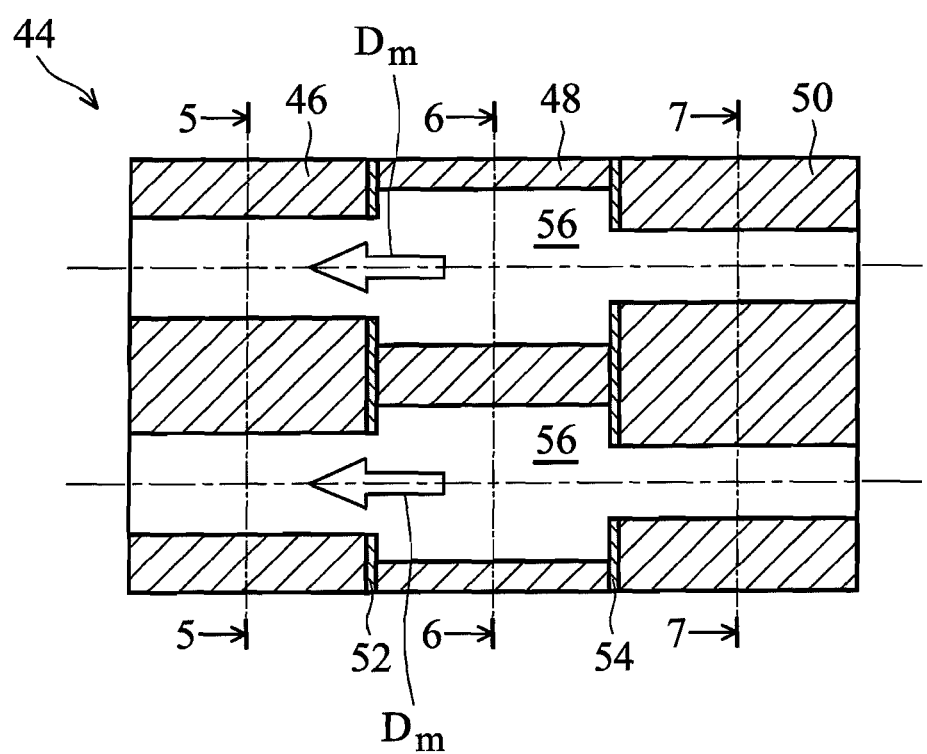
FIG. 6 shows a sectional view of still another form of the magnetic heat exchange unit of the present invention.
Figure 7C:
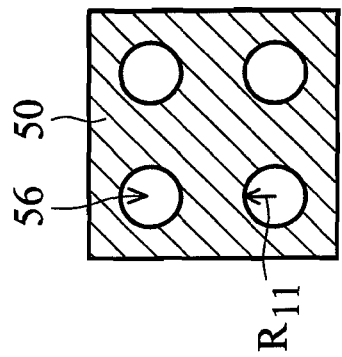
FIG. 7C is a sectional view taken along a line 7-7 of FIG. 6.
Figure 7B:
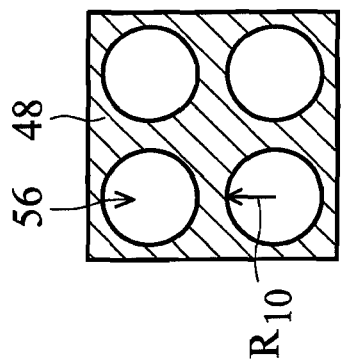
FIG. 7B is a sectional view taken along a line 6-6 of FIG. 6.
Figure 7A:
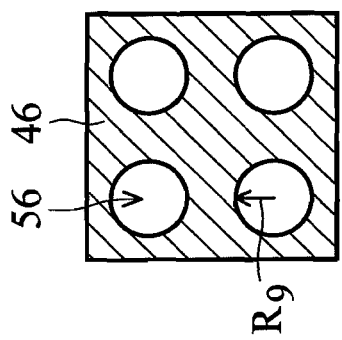
FIG. 7A is a sectional view taken along a line 5-5 of FIG. 6.

Turning to FIGS. 6 and 7A-7C, still an alternative form of a magnetic heat exchange unit of the present invention is illustrated and generally designated by the numeral 44, wherein FIGS. 7A-7C respectively shows sectional views taken along lines 5-5, 6-6 and 7-7 in FIG. 6. The magnetic heat exchange unit 44 is similar in many respects to the previous described embodiments as shown in FIGS. 1-4, and 5A-5C and comprises three magnetocaloric materials 46, 48, and 50, two insulators 52 and 54, and a plurality of fluid pathways 56. In the embodiment, the magnetic heat exchange unit 44 has four fluid pathways 56 as shown in FIGS. 7A-7C.

Each of the magnetocaloric materials 46, 48, and 50 in the embodiment are made of different materials, and the magnetocaloric material 48 is interconnected between the magnetocaloric materials 46 and 50. The insulator 52 is disposed between the magnetocaloric materials 46 and 48, and the insulator 54 is disposed between the magnetocaloric materials 48 and 50. The insulators 52 and 54 are partially exposed in the fluid pathways 56 and configured to insulate heat conveyed between the magnetocaloric materials 46, 48, and 50. It is noted that the insulators 52 and 54 may be also electrical insulators.

The fluid pathways 56 are both laterally and transversely spaced-apart from one another and are disposed in the magnetic heat exchange unit 44. More particularly, the fluid pathways 56 are disposed in spaces constructed by the magnetocaloric materials 46, 48, and 50 and the insulators 52 and 54. The fluid pathways 56 in each of the magnetocaloric materials 46, 48, and 50 have different cross-sections. Specifically, as shown in FIGS. 7A-7C, along the sliced line 5-5, the radius of each of the fluid pathways 56 in the magnetocaloric material 46 is $R_9$; along the sliced line 6-6, the radius of each of the fluid pathways 56 in the magnetocaloric material 48 is $R_{10}$; along the sliced lines 7-7, the radius of each of the fluid pathways 56 in the magnetocaloric material 50 is $R_{11}$, wherein the radius $R_{10}$ is larger than the radius $R_9$, and the radius $R_9$ is larger than the radius $R_{11}$.

It is appreciated that due to the configuration of the fluid pathways 56, the magnetic heat exchange unit 44 provides similar results as the magnetic heat exchange unit 30 as shown in FIGS. 4 and 5A-5C. It is noted that although the magnetocaloric materials 46, 48, and 50 are made by different materials, the magnetocaloric materials 46, 48, and 50 may present the same Curie temperature or different Curie temperatures.

Figure 8A:
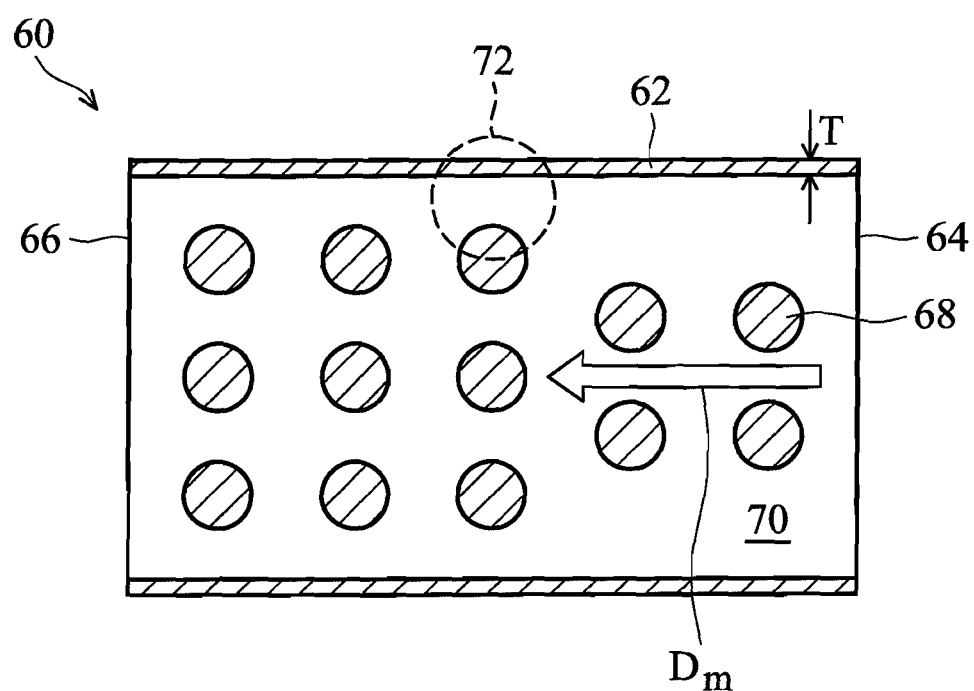
FIG. 8A shows a cross-sectional view of still another form of the magnetic heat exchange unit of the present invention.
Figure 8B:
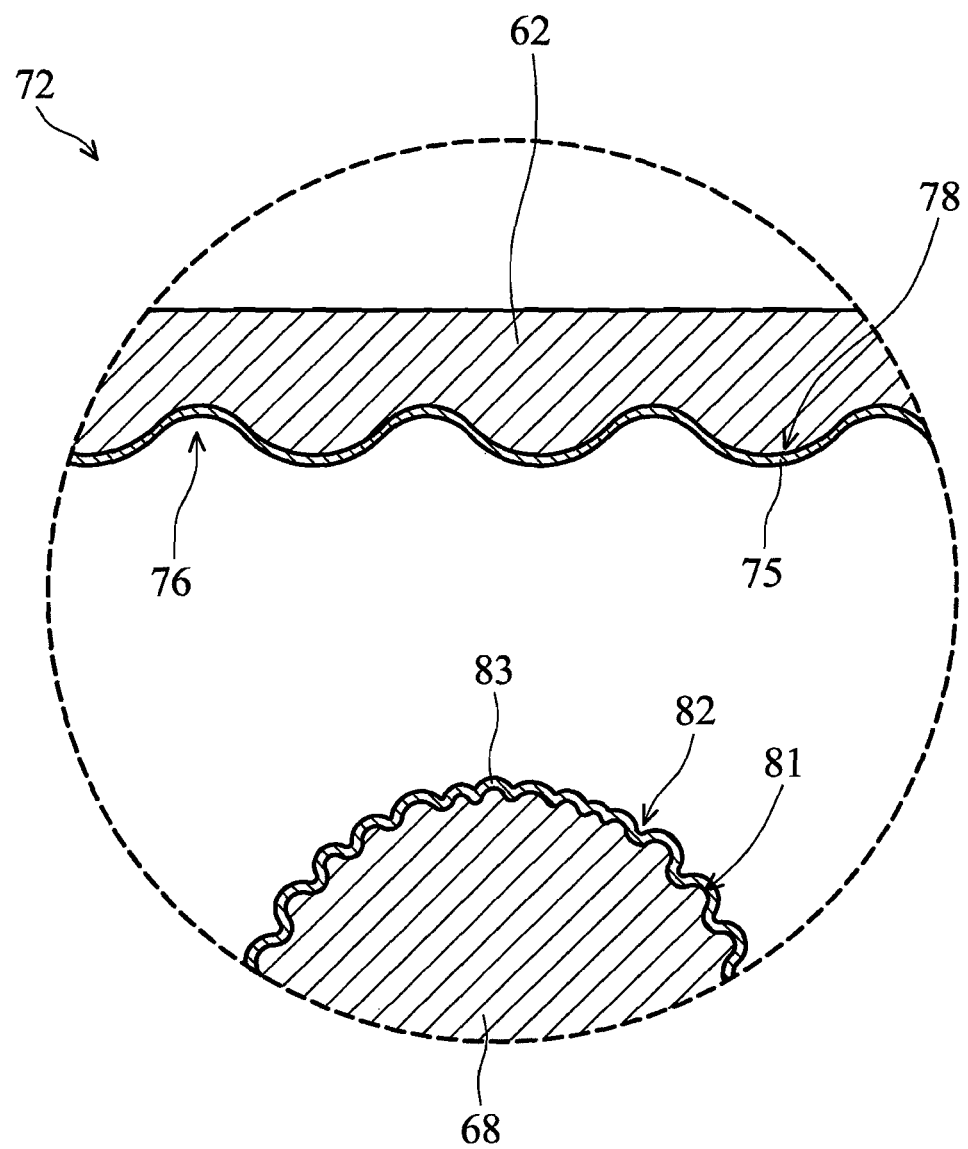
FIG. 8B is a greatly enlarged, cross-sectional view taken form region 72 of FIG. 8A.

Turning to FIGS. 8A-8B, a magnetic heat exchange unit 60 is illustrated, wherein FIG. 8B is a greatly enlarged, cross-sectional view taken form region 72 of FIG. 8A. The magnetic heat exchange unit 60 comprises a case 62, a plurality of heat-exchanging elements 68, and a fluid pathway 70. The case 62 is basically a two-ends-hollowed structure and has a circular side wall with a thickness T. In the embodiment, the thickness T is constant along an axis of the magnetic heat exchange unit 60, and the case 62 comprises a magnetocaloric material, but it is not limited thereto. A main fluid flowing direction $D_m$ is substantially parallel to the axis of the magnetic heat exchange unit 60. As shown in FIG. 8B, the protrusions 78 and the depressions 76 are formed partially at inner walls of the case 62. In an embodiment, a barrier layer 75 is formed partially at inner walls of the case 62. In an embodiment, the protrusions 78 and the depressions 76 are formed partially at inner walls of the case 62, and the barrier layer 75 is further formed at the protrusions 78 and the depressions 76. In an embodiment, the barrier layer 75 is formed by lining, coating or painting so as to prevent corrosion occurring.

It should be understood that the term "case" in this embodiment and the term "magnetocaloric material" used in FIGS. 1-8 substantially describe identical elements if the case is at least a part been made of a magnetocaloric material. However, in order to emphasize that the case can be made by normal material, not magnetocaloric material, a modification is made.

The heat-exchanging elements 68 comprise magnetocaloric material, are disposed in the case 62 and thus can exchange heat with the heat transfer medium. To fix the heat-exchanging elements 68 in the fluid pathway 70, a plurality of supports (not shown in FIGS. 8A-8B) are used and are interconnected between the heat-exchanging elements 68 and the inner wall of the case 62. As shown in FIG. 8B, the heat-exchanging element 68 comprises at least one protrusion 81 and/or depression 82. Furthermore, the heat-exchanging element 68 may comprise a barrier layer 83 covering partially at the heat-exchanging element 68. In an embodiment, the protrusions 81 and the depressions 82 are partially formed at the heat-exchanging elements 68, and the barrier layer 83 is formed partially at the protrusions 81 and/or the depressions 82. In an embodiment, the barrier layer 83 is formed by lining, coating or painting to prevent corrosion occurring after a long period of use.

It is noted that, in this embodiment, a cross-section is defined by an area difference between a cross-section of the case and cross-section(s) of the heat-exchanging element(s) if the cuffing line sliced through an area where the heat-exchanging element(s) is disposed.

Advantages of the magnetic heat exchange unit 60 are described as follows. After the heat-exchanging elements 68 heat up due to an external magnetic field, i.e., magnetic flux, the heat transfer medium (not shown in FIGS. 8A-8B) is supplied along the main fluid flowing direction $D_m$ to exchange heat with the heat-exchanging elements 68. However, with a decrease of the temperature difference between the heat transfer medium and the heat-exchanging elements 68, heat exchange efficiency decreases along the main fluid flowing direction $D_m$. In this regard, a number of the heat-exchanging elements 68 disposed in the region near a fluid outlet 66 of the case 62 (or the fluid pathway 70) is more than a number of the heat-exchanging elements 68 disposed in the region near a fluid inlet 64 of the case 62 (or the fluid pathway 70). Although a cross-section is generally shrunk along the main fluid flowing direction $D_m$ in this embodiment, the contact area between the heat-exchanging elements 68 and the heat transfer medium is increased. Thus, the heat exchange efficiency is maintained along the main fluid flowing direction $D_m$.

Another reason why heat exchange efficiency is maintained constantly is attributed to the protrusions 78 and 81 and depressions 76 and 82 formed on the surface of the inner wall of the case 62 and formed around the heat-exchanging elements 68, respectively, because the contacting area is effectively increased.

It is noted that although the array of heat-exchanging elements 68 depicted in FIG. 8A is well-ordered, this is not an essential feature of the invention and a designer might populate the fluid pathway 70 with heat-exchanging elements 68 in a random-arranged fashion. Additionally, the shape of the heat-exchanging elements need not be of the circular geometric form as shown in FIG. 8A but could take any shape that the designer believes would produce the desired contact area under conditions of particular end-use applications.

Figure 9:
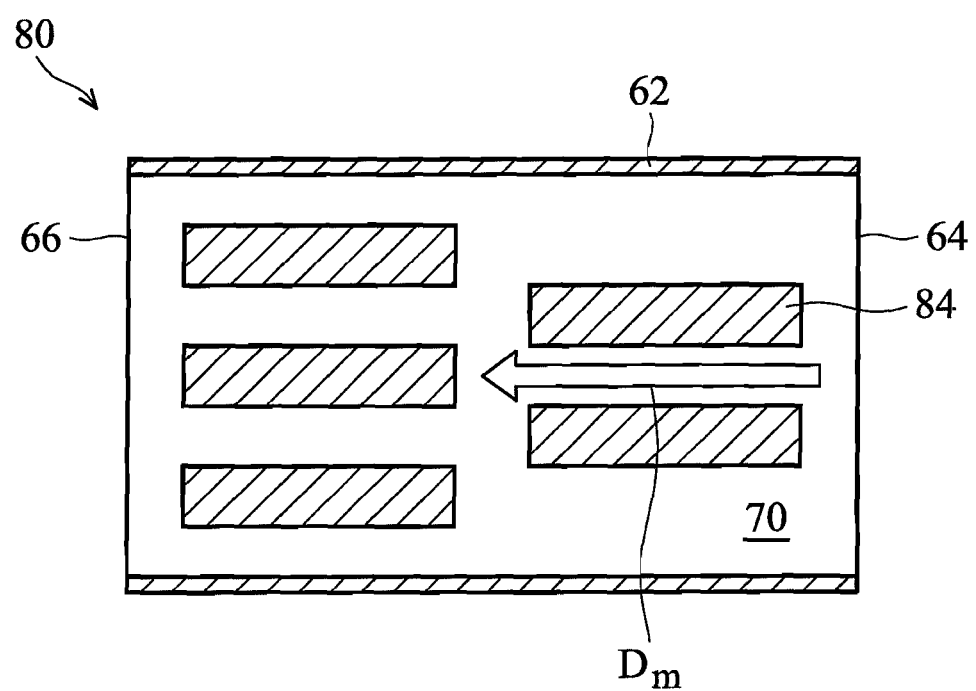
FIG. 9 shows a sectional view of still another form of the magnetic heat exchange unit of the present invention.
Figure 10:
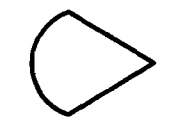
Figure 11:
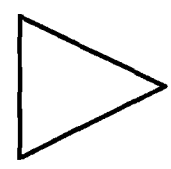
Figure 12:
Figure 15:
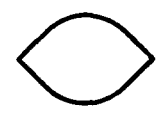
Figure 16:
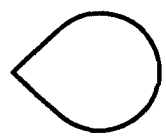
Figure 17:

For example, please turn to FIG. 9, still an alternative form of a magnetic heat exchange unit of the present invention is illustrated and generally designated by the numeral 80, wherein like numerals designate like or corresponding parts in FIG. 8A, and an explanation that has been given already will be omitted in the following description. The difference between the magnetic heat exchange unit 60 as shown in FIG. 8A and the magnetic heat exchange unit 80 is the shape of the heat-exchanging elements. In this embodiment, the heat-exchanging elements 84 shown in FIG. 9 are in the form of a rod or a cuboid, which is elongated along the main fluid flowing direction $D_m$.

Other forms of the heat-exchanging elements are shown in FIGS. 10-17 Each of the drawings shows a cross-sectional shape of the heat-exchanging elements cut along an axis of the magnetic heat exchange unit, wherein the cross-sectional shape of the heat-exchanging element is triangular, rectangular, polygonal, circular, elliptic, droplet-shaped, fusiform or a combination of these shapes.

Similarly, the shape of the case need not be of the geometric form as shown in FIG. 8A but could take any shape that the designer believes would produce the desired contacting area under conditions of particular end-use applications.

Figure 18:
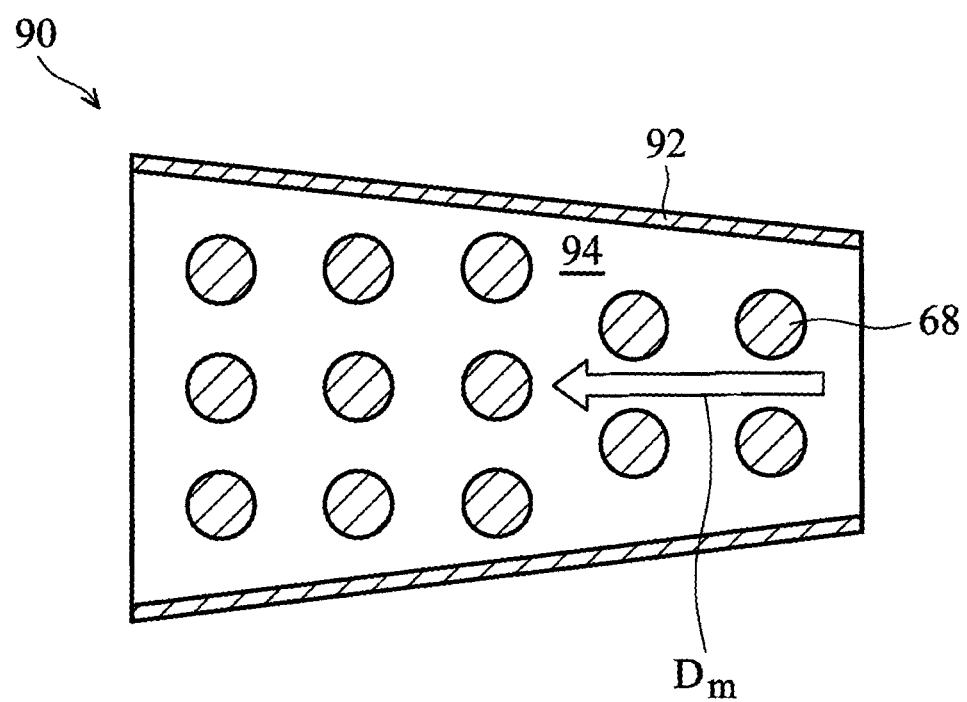
FIG. 18 shows a sectional view of still another form of the magnetic heat exchange unit of the present invention.
Figure 21:
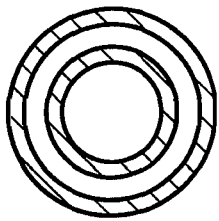
FIGS. 19-24 show sectional views of varieties of forms of cases of the magnetic heat exchange unit of the present invention.
Figure 24:
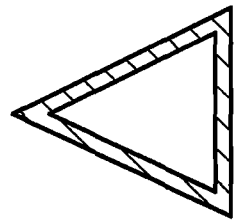
Figure 20:
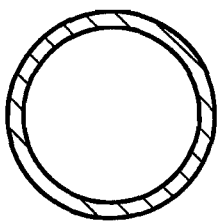
Figure 23:
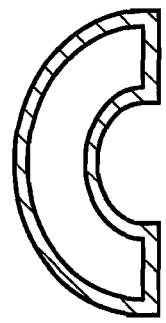
Figure 19:
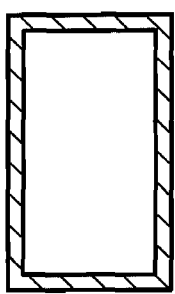
Figure 22:
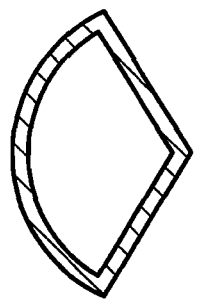

For example, please turn to FIG. 18, wherein still an alternative form of a magnetic heat exchange unit of the present invention is illustrated and generally designated by the numeral 90, and like numerals designate like or corresponding parts in FIG. 8A, and explanation that has been given already will be omitted in the following description. The difference between the magnetic heat exchange unit 60 as shown in FIG. 8A and the magnetic heat exchange unit 90 is the shape of the case. In this embodiment, the case 92 is taper-shape, and the fluid pathway 94 is defined by the case 92. By increasing the contact area and slowing down the rate of flow of the heat transfer medium, the heat exchange efficiency is maintained along the main fluid flowing direction $D_m$.

Other forms of the cases are shown in FIGS. 19-24. Each of the drawings shows a cross-sectional shape of the cases cut along a transversal line, perpendicular to the main fluid flow direction, of the magnetic heat exchange unit, wherein the cross-sectional shape of the case is triangular, rectangular, circular, annular, sector, arc-shaped or any combination of these shapes.

As mentioned above, a significant portion of cooling efficiency of the magnetic cooling resides in heat exchange capacity or efficiency between the magnetocaloric materials and a heat transfer media. According to the thermal principle, factors affecting the heat exchange capacity or efficiency include: thermal properties of the magnetocaloric materials and the heat transfer media (e.g. specific heat, thermal conductivity), temperature cascade between the magnetocaloric materials, and a temperature difference or a contacting area between the heat transfer media and the magnetocaloric materials, . . . etc.

By the way, as refer to all embodiments abovementioned, there are some additives for enhancing performance could be added into the fluid pathway, such as a dispersant, an anti-corrosion agent, an antifreeze agent, or a drag-reduction agent. The dispersant (or dispersing agent, or plasticizer, or super-plasticizer) is added to improve the separation of particles and to prevent clumping or the accumulation of sludge. Dispersants consist normally of one or more surfactants, but may also be gases. The anti-corrosion agent (or corrosion inhibitor) is used for preventing magnetocaloric material from corrosion or erosion after cycles of fluid passing by. The antifreeze agent (or anti-frozen agent) is used for preventing the working fluid from freezing in some cooling processes. The drag-reduction agent (or flow improve) is used to reduce the frictional pressure drop along the pipeline's length so as to decrease the power lose caused by the resistance therebetween.

Thus, based on these factors, the present invention is devoted to provide a magnetic heat exchange unit in which a fluid pathway having a varying cross-section disposed therein. The novel fluid pathway does not only effectively improve heat exchange capacity or efficiency in the magnetic heat exchange unit, but realizes a reduction in usage of the magnetocaloric materials. Consequently, problems which hinder magnetic refrigeration are solved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A magnetic heat exchange unit, comprising:
   at least two magnetocaloric materials;
   at least one insulator, disposed between the at least two magnetocaloric materials; and
   at least one fluid pathway, formed in the magnetocaloric material, having a fluid inlet and a fluid outlet to define a main fluid flowing direction,
   wherein the fluid pathway is tapered and a cross-section of the fluid pathway varies along the main fluid flowing direction.

2. The magnetic heat exchange unit as claimed in claim 1, wherein the magnetocaloric material comprises at least two different Curie temperatures.

3. The magnetic heat exchange unit as claimed in claim 1, wherein the magnetocaloric material comprises at least two different types of magnetocaloric materials.

4. The magnetic heat exchange unit as claimed in claim 1, further comprising a dispersant, an anti-corrosion agent, an antifreeze agent, or a drag-reduction agent disposed within the fluid pathway.

5. A magnetic heat exchange unit, comprising:
   a case;
   at least one insulator, disposed in the case;
   at least one heat-exchanging element comprising a magnetocaloric material, disposed in the case; and
   at least one fluid pathway, defined by the case and the heat-exchanging element, having a fluid inlet and a fluid outlet to define a main fluid flowing direction,
   wherein the fluid pathway is tapered and a cross-section of the fluid pathway varies along the main fluid flowing direction.

6. The magnetic heat exchange unit as claimed in claim 5, wherein the heat-exchanging elements have different Curie temperatures.

7. The magnetic heat exchange unit as claimed in claim 5, wherein the heat-exchanging elements are made of different types of magnetocaloric materials.

8. The magnetic heat exchange unit as claimed in claim 5, wherein the case is made of a magnetocaloric material.

9. The magnetic heat exchange unit as claimed in claim 5, wherein the cross-sectional shape of the case is triangular, rectangular, circular, annular, sector, arc-shaped or any combination thereof.

10. The magnetic heat exchange unit as claimed in claim 9, wherein the case has an axis, and the cross-sectional shape of the heat-exchanging element along the axis is triangular, rectangular, polygonal, circular, elliptic, droplet-shaped, fusiform or any combination thereof.

11. The magnetic heat exchange unit as claimed in claim 5, further comprising at least one of a protrusion and depression formed on at least one of an inner wall of the case and the heat-exchanging element.

12. The magnetic heat exchange unit as claimed in claim 5, further comprising a barrier layer formed on at least one of an inner wall of the case and the heat-exchanging element.

13. The magnetic heat exchange unit as claimed in claim 5, further comprising a dispersant, an anti-corrosion agent, an antifreeze agent, or a drag-reduction agent disposed within the fluid pathway.

* * * * *